US006950412B2

(12) United States Patent
Lee et al.

(10) Patent No.: US 6,950,412 B2
(45) Date of Patent: Sep. 27, 2005

(54) BASE STATION CONTROLLER IN IMT-2000 SYSTEM

(75) Inventors: Chae-Moon Lee, Ichon-shi (KR); Min-Jae Hwang, Ichon-shi (KR)

(73) Assignee: UTStarcom Inc., Alameda, CA (US)

(*) Notice: Subject to any disclaimer, the term of this patent is extended or adjusted under 35 U.S.C. 154(b) by 749 days.

(21) Appl. No.: 09/752,918

(22) Filed: Jan. 2, 2001

(65) Prior Publication Data

US 2001/0006516 A1 Jul. 5, 2001

(30) Foreign Application Priority Data

Dec. 30, 1999 (KR) ........................................ 1999-67504

(51) Int. Cl.[7] ............................... H04B 7/00; H04J 3/04

(52) U.S. Cl. .................... 370/310.2; 370/328; 370/389; 370/535

(58) Field of Search ............................. 370/310.2, 328, 370/338, 389, 395.52, 395.62, 395.71, 401, 535, 310.1

(56) References Cited

U.S. PATENT DOCUMENTS 5,978,361 A * 11/1999 Kokudo .................. 370/310.2
6,018,521 A 1/2000 Timbs et al. ................ 370/342
6,034,950 A 3/2000 Sauer et al. ................ 370/328
6,049,543 A 4/2000 Sauer et al. ................ 370/395
2002/0003800 A1 * 1/2002 Jeong et al.

FOREIGN PATENT DOCUMENTS

| | | |
|---|---|---|
| JP | 06-252909 | 9/1994 |
| JP | 08-265838 | 10/1996 |
| JP | 09-307945 | 11/1997 |
| JP | 11-275655 | 10/1999 |
| WO | WO 99/33207 | 7/1999 |
| WO | WO 99/33314 | 7/1999 |

* cited by examiner

*Primary Examiner*—Afsar Qureshi
(74) *Attorney, Agent, or Firm*—McDonnell Boehnen Hulbert & Berghoff LLP

(57) ABSTRACT

A base station controller in IMT-2000 system is disclosed. The base station controller includes a local routing unit for interfacing the BTS with the MSC, for processing a call and a No. 7 signal and for providing alarms occurred in the BSC to the BSM; a vocoding unit for vocoding voice data received through the local routing unit; a global routing unit for interfacing among the local router, other local routers and the BSM; and a clock generating unit for clocks necessary for controlling the BTS and the BSM based on time and frequency clocks received from a global positioning system (GPS).

20 Claims, 9 Drawing Sheets

BASE STATION CONTROLLER IN IMT-2000 SYSTEM

FIELD OF THE INVENTION

The present invention relates to a mobile telecommunication system; and, more particularly, to a base station controller which is capable of being compact and improves the quality of services in an international mobile telecommunication-2000 (IMT-2000) system. The base station controller according to the present invention adopts a high capacity ATM switch in a network matching in order to improve the quality of telecommunication services and is made compact by building a plurality of blocks, which are in the base station controller, in a local router.

DESCRIPTION OF THE PRIOR ARTS

Generally, in order to design a code division multiple access (CDMA) system (IMT-2000) providing multimedia services, such as voice, picture and low/high speed data services, a system network matching capacity, routing protocols, qualities of various services and so on should be considered.

FIG. 1 is a block diagram illustrating a base station controller and its periphery devices in a conventional IS-95A and IS-95B system.

A base transceiver station apparatus 10 including a plurality of base transceiver stations BTS1 to BTSn is interfaced with mobile stations via wireless telecommunications and interfaced with a base station controller 20 via an E1/T1 link.

For data Interface, the base station controller 20 is coupled to each of base transceiver stations in the base transceiver station apparatus 10 via the E1/T1 link and coupled to a mobile switching center 70 and a global CDMA interconnection network 60.

A global positioning system (GPS) receiver 30 receives time and frequency clocks from a GPS and transmits them to the base station controller 20. A base station management 40 carries out management in the entire system as well as management and maintenance in the base station controller and a Global CDMA Interconnection Network (GCIN) 60 provides a data interface among the base station controller 20, the base station management 40 and a different Local CDMA Interconnection Network (LCIN) 50. In FIG. 1, the reference numeral 70 denotes a mobile switching center (MSC) interfaced with the base station controller 20 in voice, picture and high/low speed data, including a plurality of access switching subsystem-mobile (ASS-M) blocks.

On the other hand, a LCIN 23 in the base station controller 20 provides data interface between the base transceiver station apparatus 10 and the GCIN 60 via the E1/T1 link and also provides data interfaces among other blocks in the base station controller 20 via a U-link 21. In this specification, U-link means a link between units. A Call Control Processor (CCP) 24 is connected to the U-link 22 and then processes calls, which are input into the base station controller 20, and a Common Channel Signaling Block (CSB) 25 processes No. 7 signals. An Alarm Control Processor (ACP) 26 collects alarms generated in the base station controller and reports the result of the collection to the base station management 40. A clock generator 27 processes time and frequency clocks from the global positioning system (GPS) receiver 30, produces a plurality of system clocks, and distributes the produced system clocks to each stage in the system. A vocoder 28 including a plurality of transcoder and selector banks TSB1 to TSBn takes charge of coding voices from the base station controller 20 and the mobile switching center (MSC) 70.

The base station controller in the conventional IS-95A-IS-95B having the above-mentioned structure and operation is sufficient to process the low speed data and voice service but has many problems in processing large capacity data transmission such as a video transmission for a conference or a high-speed internet service.

First, the network matching capacity has a transmission rate of about 187 Mbps in a full load. This capacity is sufficient to process the low speed data but not sufficient to process high speed data of which maximum data transmission is required up to 187 Mbps, especially in IMT-2000 system.

For reference, data transmission rate required in each system is shown on the following table 1.

TABLE 1

Required maximum transmission rate in each system

| Maximum transmission rate/kind of system | IS-95A | | IS-95B | | IMT-2000 | |
|---|---|---|---|---|---|---|
| | DCS | PCS | DSC | PCS | 1X | 3X |
| Voice (bps) | 9.6K | 14.4K | 9.6K | 14.4K | 9.6/ 14.4K | 9.6/ 14.4K |
| Packet data (bps) | 9.6K | 14.4K | 64K | 64K | 144K | 384K |
| Circuit data (bps) | 9.6K | 14.4K | 9.6K | 14.4K | 9.6/ 14.4K | 128K |

Second, vocoders in the transcoder and selector banks TSB for the low speed data service receive the data signals of 9.6 Kbps or 14.4 Kbps transmitted via the local CDMA interconnection network (LCIN), convert them into pulse code modulation (PCM) signal of 64 Kbps and transmit the converted signals to the mobile switching center (MSC), however, since the maximum data transmission rate through these data paths is about 64 Kbps, it is impossible to adopt these data paths in the IMT-2000 system.

Third, the network matching in the IMT-2000 system to provide the multimedia service is in need of an interface over 15 Mbps for transmitting the high speed data transmission. However, since the U-link in the conventional system provides an interface of 10M, 5M, 2.5M or 1.25M , it is not available to the high speed transmission lines and various interfaces, such as OC-3, E3/T3, E1/T21 and 25M, which are required in the IMT-2000 system.

Fourth, the data transmission methods based on the ATM are typically adopted by various system manufacturers. Accordingly, in the case where the inter processor communication (IPC) in the form of the modified High-Level Data Link Controller (HDLC) is used, an ATM cell modification has been required.

Fifth, since the CCP for processing the calls, the ACP for processing different alarms, the CSB for processing No. 7 signals the TSB for processing voices, twelve CKDs for providing clock signals, the global router for hand-off transmission are individually constructed in the conventional IMT-2000 system, the system in the base station controller has a complicated structure and the size of the entire system becomes larger.

SUMMARY OF THE INVENTION

It is, therefore, an object of the present invention to provide a base station controller satisfying the quality of services required in the multimedia services.

Another object of the present invention is to provide a compact base station controller mounting a plurality of blocks on a local router in the type of board.

In accordance with an aspect of the present, there is provided an apparatus for controlling a base transceiver station in an international mobile telecommunication system having a plurality of the base transceiver station (BTS), at least a base station controller (BSC), a base station management (BSM) and a mobile switching center (MSC), the apparatus including: a local routing unit for interfacing the BTS with the MSC, for processing a call and a No. 7 signal and for providing alarms occurred in the BSC to the BSM; a vocoding unit for vocoding voice data received through the local routing unit; a global routing unit for interfacing among the local router, other local routers and the BSM; and a clock generating unit for clocks necessary for controlling the BTS and the BSM based on time and frequency clocks received from a global positioning system (GPS).

BRIEF DESCRIPTION OF THE DRAWINGS

Other objects and aspects of the invention will become apparent from the following description of the embodiments with reference to the accompanying drawings, in which.

PREFERRED EMBODIMENTS OF THE INVENTION

Hereinafter, the preferred embodiment of the present invention will be described in detail referring to accompanying drawings.

Figure 1:
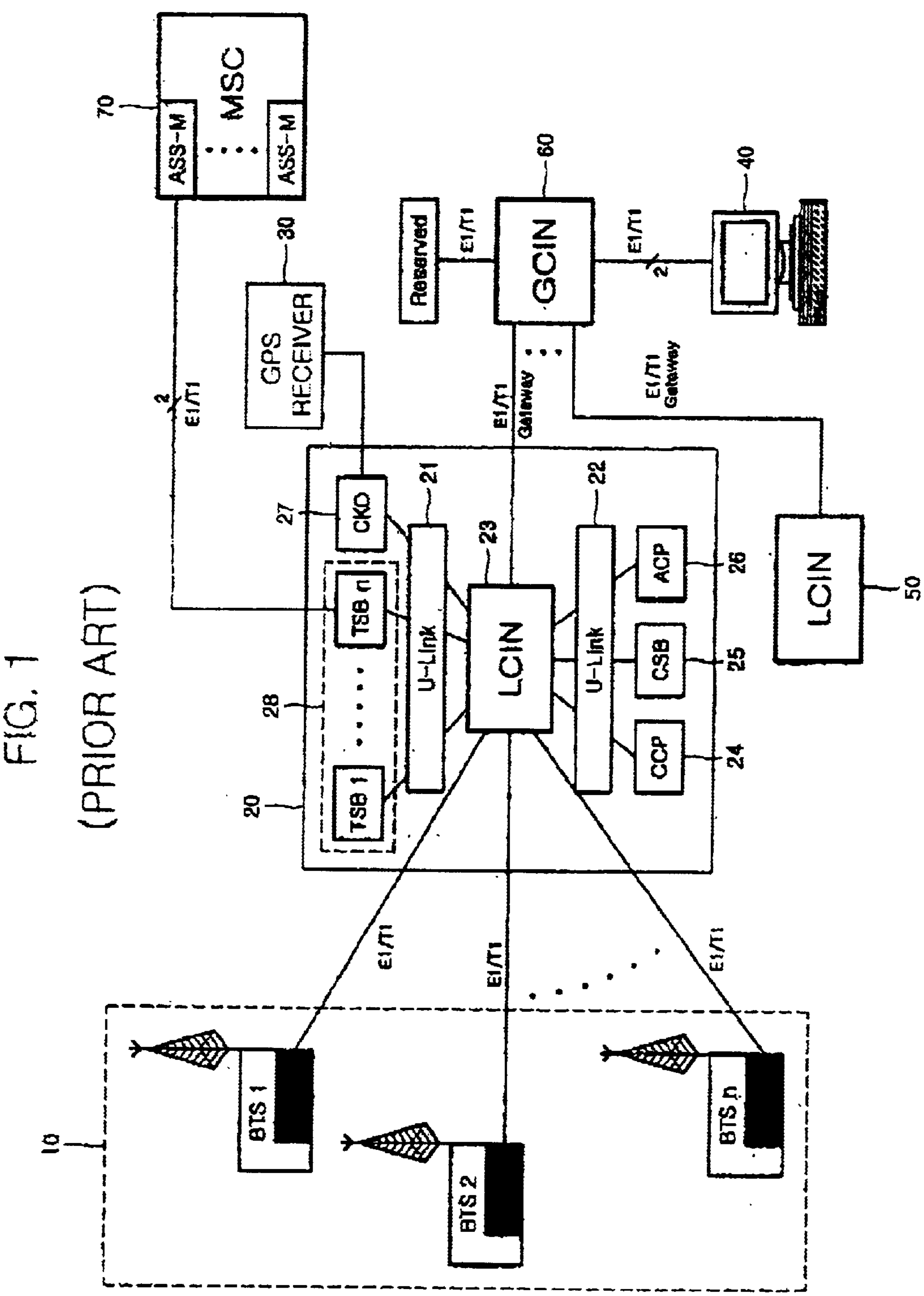
FIG. 1 is a block diagram illustrating a base station controller and its periphery devices in a conventional IS-95A and IS-95B system.
Figure 2:
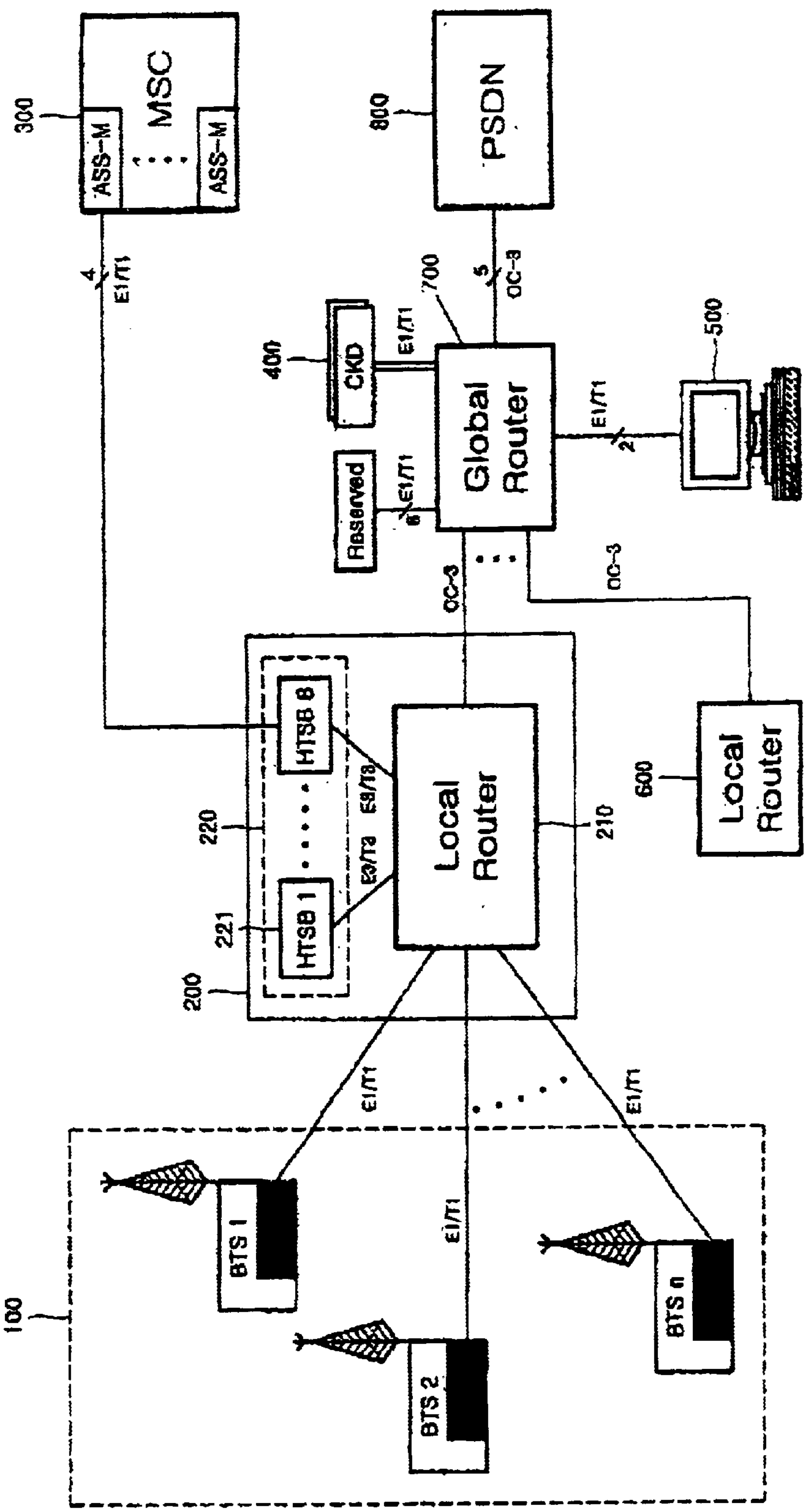
FIG. 2 is a block diagram illustrating a base station controller in an IMT-2000 according to the present invention.

First, referring to FIG. 2, a base transceiver station apparatus 100 of an IMT-200 system according to the present invention is interfaced with a mobile station via wireless telecommunications, including a plurality of base transceiver stations BTS1 to BTSn. A base station controller 200 is coupled to the base transceiver station apparatus 100 via an E1/T1 link so that it provides an ATM packet data interface. Also, the base station controller 200 encodes data transmitted from the base transceiver station apparatus 100, transmits them to a mobile switching center 300, performs call and/or No. 7 signal processes, collects alarms issued in the base station controller 200, and finally transmits the collected signals to a base station management.

The mobile switching center 300 is interlaced with the base station controller 200 in voice, picture data and includes a plurality of access switching subsystems-mobile (ASS-M). Also, a clock generator 400 receives time and frequency clock signals from a GPS and produces system clocks using the received clock signals. In similar to the conventional base station management, a base station management (BSM) 500 in FIG. 2 manages the entire system with the management and maintenance of the base station controller 200. A local router 600, which is included in a different base station controller, a part in routing ATM packet data and a global router 700 provides data interfaces among the local router 600, the base station management 500, the base station controller 200 and a packet data network (PSDN) 800.

The base station controller 200 of the above-mentioned IMT-2000 system provides a data interface for the ATM packet data transmitted from the base transceiver station apparatus 100 and performs a vocoding operation through a vocoder, transmitting vocoded data to the mobile switching center 300. Also, the base station controller 200 provides an interface for data switched in the mobile switching center 300 and provides an interface for transmitting the ATM packet data to a required base transceiver station in the base transceiver station apparatus 100 through the vocoder and the ATM router.

As compared with the conventional base station controller suggested in the IS-95A/IS95B using communication protocols based on the high-level data link controller (HDLC) packet routing method and individually processing the calls and the No. 7 signals in separate blocks, the base station controller according to the present invention uses communication protocols based on the ATM packet routing method and processes both the calls and No. 7 signals in the local router 210 which is mounted on the same board.

As shown in FIG. 2, the base station controller 200 includes a local router 210 and a vocoder 220. The local router 210, which is interfaced with the base transceiver station apparatus 100 for processing the ATM packet data, processes the calls and the No. 7 signals, collects the alarms from generated in the base station controller 200 and transmits the collected alarms to the base station management 500. The vocoder 220 includes a plurality of high-speed transcoder and selectors HTSB1 to HTSB8 which are connected with the local router 210 through E3/T3 links and performs the vocoding operations.

Figure 3:
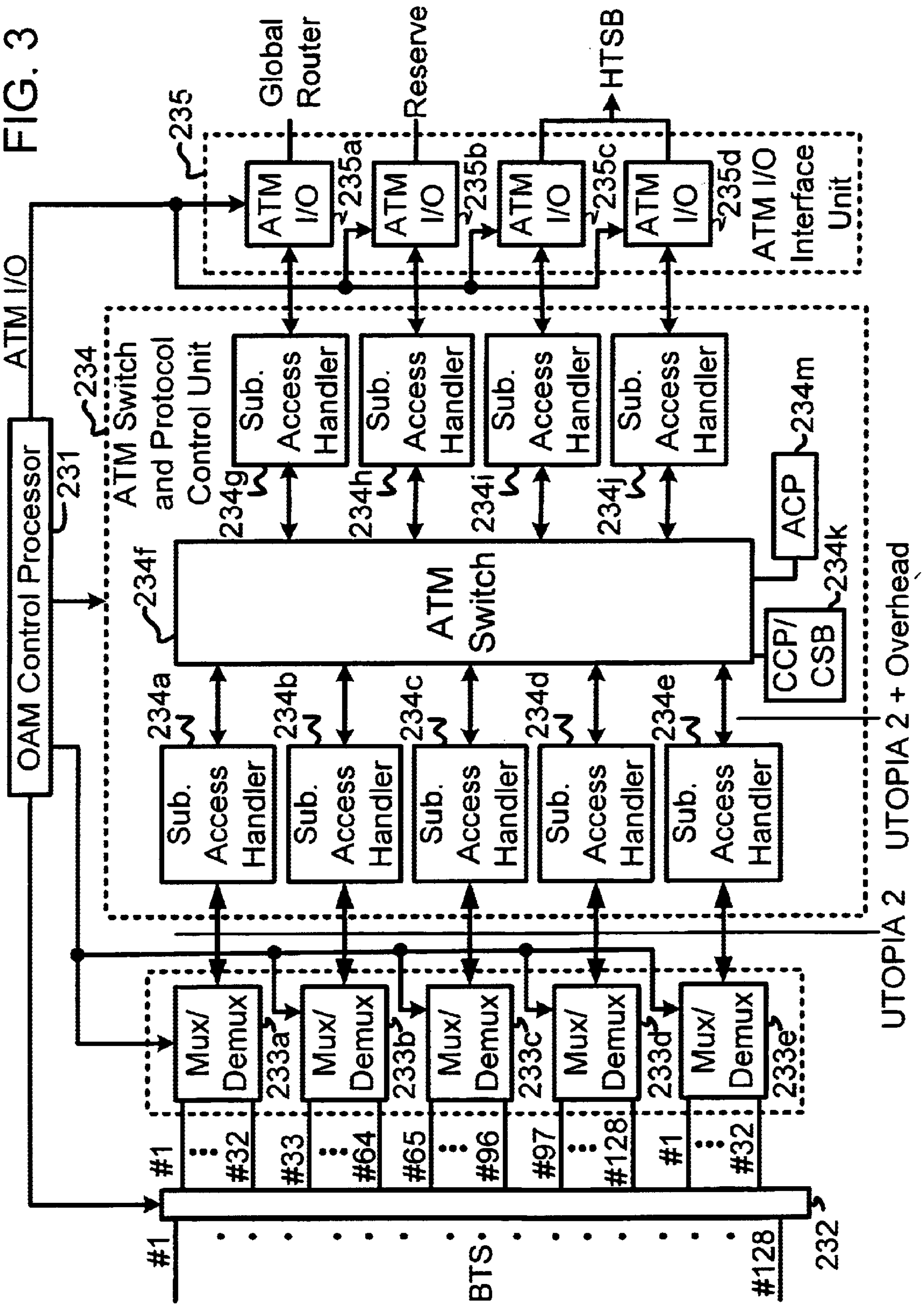
FIG. 3 is a block diagram illustrating a local router according to the present invention.

Referring to FIG. 3, the local router 210 includes an operation and maintenance (OAM) control processor 231, a low-speed protection switch board (LPSB) 232, an ATM MUX/DEMUX (multiplexing/demultiplexing) unit 233, an ATM switch and protocol control unit 234, and an ATM input/output interface unit 235.

The OAM control processor 231 controls an ATM packet routing operation, by producing a switching control signal for the ATM packet data, a multiplexing/demultiplexing control signal for multiplexing and demultiplexing the ATM packet data, an ATM switch and protocol control signal and an ATM input/output control signal. The low-speed protection switch board 232 is interfaced with the base transceiver station for the ATM packet data of 128 channels in response to the switching control signal from the OAM control processor 231. The ATM MUX/DEMUX unit 233 has a plurality of multiplexer/demultiplexers 233*a* to 233*e*, each of which multiplexes the data of 32 channels from the low-speed protection switch board 232 in response to the multiplexing/demultiplexing control signal from the OAM control processor 231 and demultiplexes the transmission data. The ATM switch and protocol control unit 234, in response to the ATM switch and protocol control signals from the OAM control processor 231, processes subscriber data from the ATM MUX/DEMUX unit 233, transmits the processed data toward the mobile switching center 300, transmits to the ATM MUX/DEMUX unit 233 the data which are based on the mobile switching center 300, processes the calls and the No. 7 signals, and collects the alarms generated in the base station controller. The ATM input/output interface unit 235 transmits the alarms output from the ATM switch and protocol control unit 234 toward the base station management (BSM) 500 and transmits the subscriber data to the vocoder 220 in response to the ATM input/output control signals from the OAM control processor 231.

As stated above, the local router 210 controls the entire ATM packet routing operation through the OAM control processor 231 producing the switching control signal for the ATM packet data, the multiplexing/demultiplexing control signal for multiplexing and demultiplexing the ATM packet data, the ATM switch and protocol control signal and the ATM input/output control signal.

The low-speed protection switch board 232 provides the interface of the ATM packet data in response to the switching control signal from the OAM control processor 231 and the interfaced ATM packet data of the 128 channels are transmitted to each of the multiplexer/demultiplexers 233*a* to 233*d* in the ATM MUX/DEMUX unit 233. The multiplexer/and demultiplexers 233*e*, which serves as a spare board, may be substituted for one of the multiplexer/demultiplexers 233*a* to 233*d*.

Since each of the multiplexer/demultiplexers 233*a* to 233*d* performs the same operation, only one of them will be described in detail.

The multiplexer/demultiplexer 233*a* includes 32 E1 ports. The multiplexer/demultiplexer 233*a* multiplexes voice signals in the type of AAL2 which transmits voice signals in the several channels by one ATM cell so that it outputs data in the type of AAL2' which makes one ATM cell per channel and transmits them to the ATM switch and protocol control unit 234. This conversion is required to perform vocoding operations in the vocoder 220. Also, the multiplexer/demultiplexer 233*a* demultiplexes the ATM cells in the type of AAL2' and transmits the demultiplexed ATM cell data, as channel signals, to the low-speed protection switch board 232.

Figure 4:
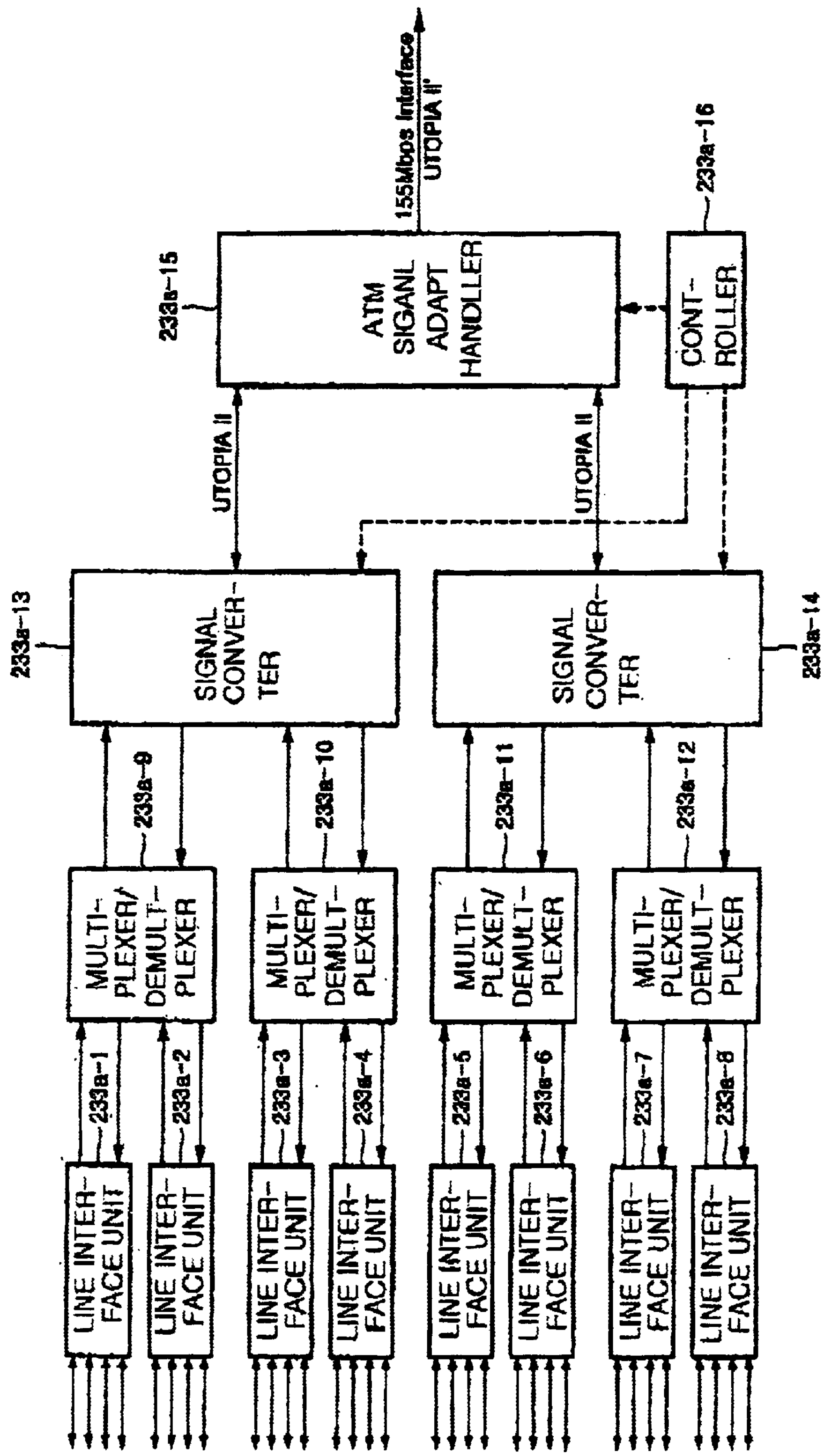
FIG. 4 is a block diagram illustrating an ATM multiplexing/demultiplexing unit according to the present invention.

FIG. 4 is a block diagram illustrating the multiplexer/demultiplexers 233*a* to 233*e* according to the present invention. As shown in FIG. 4, the first to eighth interface unit 233*a*-1 to 233*a*-8 are 4:1 multiplexer/demultiplexers, which are receive four channel signals and output data on one selected line and which receive only one data and output four channel signals.

A first multiplexer/demultiplexer 233*a*-9 multiplexes the signals multiplexed by each of the first and second interface units 233*a*-1 and 233*a*-2 once again. That is, eight E1 port signals are multiplexed and arranged in the AAL2 signals. Inversely, the AAL2 signal input from one line are demultiplexed into two line signals. A second multiplexer/demultiplexer 233*a*-10 multiplexes the signals multiplexed by each of the third and fourth interface units 233*a*-3 and 233*a*-4 once again. That is, eight E1 port signals are multiplexed and arranged in the AAL2 signals. Inversely, the AAL2 signal input from one line is demultiplexed into two line signals. Also, a third multiplexer/demultiplexer 233*a*-11 multiplexes the signals multiplexed by each of the fifth and sixth interface units 233*a*-5 and 233*a*-6 once again. That is, eight E1 port signal are multiplexed and arranged in the ARL2 signals. Inversely, the AAL2 signal input from one line is demultiplexed into two line signals. In the same manner, a fourth multiplexer/demultiplexer 233*a*-12 multiplexes the signals multiplexed by each of the seventh and eighth interface units 233*a*-7 and 233*a*-8 once again. That is, eight E1 port signals are multiplexed and arranged in the AAL2 signals. Inversely, the AAL2 signal input from one line is demultiplexed into two line signals.

Next, a first signal converting unit 233*a*-13 converts the sixteen E1 port signals, which are multiplexed by the first and second multiplexer/demultiplexers 233*a*-9 and 233*a*-10, into the AAL2' signal and then outputs the converted signals, or inversely converts the AAL2' signal into the sixteen E1 port signals. In the same manner, a second signal converting unit 233*a*-14 converts the sixteen E1 port signals, which are multiplexed by the first and second multiplexer/demultiplexers 233*a*-11 and 233*a*-12, into the AAL2' signal, or performs the dedemultiplexing operations. An ATM signal adapter handler 233*a*-15 converts the 32 E1 port signals received from the first and second signal converting units 233*a*-13 and 233*a*-14 into the ATM cells and then provides an interface for 155 Mbps data.

On the other hand, a control unit 233*a*-16 controls the ATM cell arrangement of the first and second signal converting units 233*a*-13 and 233*a*-14 and the ATM signal adapter handler 233*a*-15.

Figure 5:
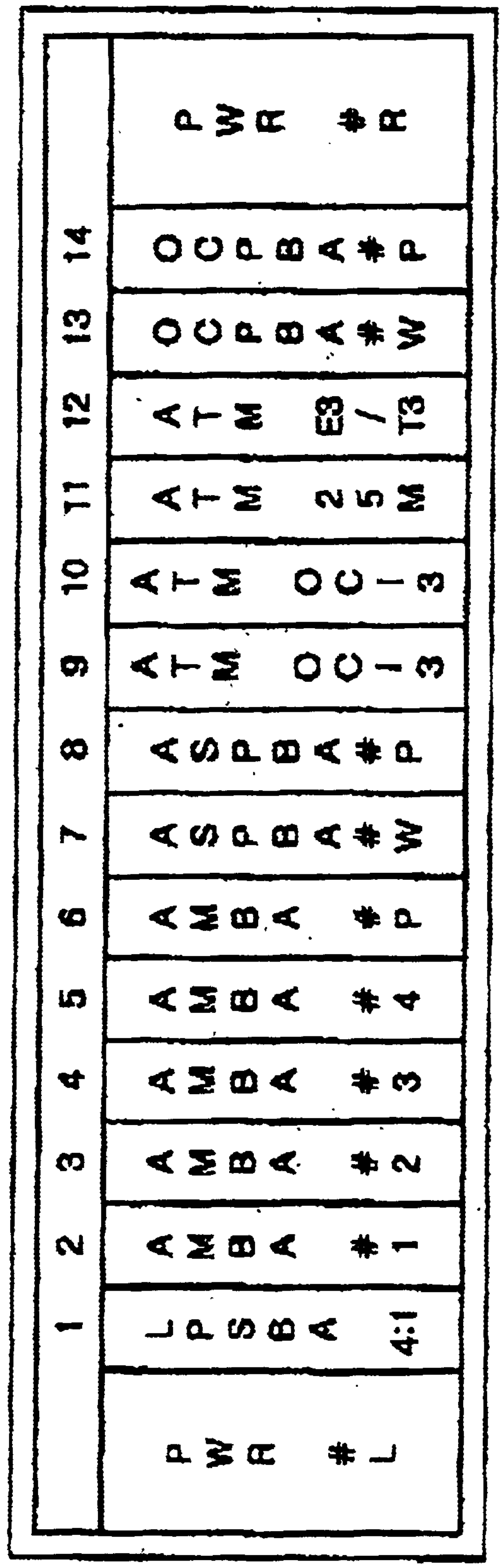
FIG. 5 is a block diagram illustrating a self-mount of the local router according to the present invention.

FIG. 5 shows a self-mount of the local router according to the present invention. An ATM Mux/Demux board assembly (AMBA) board contains 32 E1 ports and 128 E1 ports are connected to the four AMBA boards. An ATM E3/T3 board provides eight E3/T3 ports in order to connect the local router 210 to the high-speed transcoder and selectors HTSB1 to HTSB8, ATM OC-3 boards provides four OC-3 ports in order to transmit the high-speed packet data. Also, an ATM 25M board is an interface board to be connected to a 12 TP-25M port. OCPBA boards are made double, which perform the management of different alarms as well as the network management The ATM switch and protocol control unit 234 processes the subscriber data from the ATM MUX/DEMUX unit 233, transmits the processed subscriber data toward the mobile switching center 300, processes the calls and the No. 7 signals, collect and outputs the alarms generated in the base station controller in response to the switching and protocol control signals from the OAM control processor 231.

In other words, as shown in FIG. 3, first to fifth subscriber access handlers 234*a* to 234*e* in the ATM switch and protocol control unit 234 receives the AAL2' signals converted in the ATM MUX/DEMUX unit 233 and then transmits the received data to an ATM switch 234*f*. The fifth subscriber access handler 234*e*, as a preparatory board, may be substituted for one of the first to fifth subscriber access handlers 234*a* to 234*e* when a failure occurs therein. The ATM switch 234*f* switches the subscriber data from the first to fifth subscriber access handlers 234*a* to 234*e* to sixth to ninth subscriber access handlers 234*g* to 234*j* in response to the switching and protcocol control signals from the OAM control processor 231. Of course, it is possible to process the ATM data based on the bi-directional data processing. Also, the ATM switch 234*f* is couple to the call and No. 7 signal processor 234*k* in order to switch the call processing signals and the No. 7 signals to the call and No 7 signal processor 234*k*. In the conventional base station controller, the calls and No. 7 signals are process in separate processing blocks, but in the present invention both of them are processed in one block (i.e., one board). An alarm control processor 234*m* collects the alarms generated in the base station controller and the ATM switch 234*f* switches them toward the global router.

The ATM input/output interface unit 235 includes first to fourth ATM input/output devices 235*a* to 235*d*. Accordingly, the alarms from the ATM switch and protocol control unit 234 are transmitted toward the base station management (BSM) 500 and the subscriber data are transmitted to the vocoder 220 in response to the ATM switch and protocol control signal from the OAM control processor 231.

That is, the first ATM input/output interface 235*a* transmits the alarms, which are collected by the CO-3 interface, to the global router. The second ATM input/output interface 235*b*, as a preparatory interface board, may be substituted for the first input/output interface unit 235*a* at the time of failure of the first input/output interface unit 235*a* or provides an interface with other boards. The third ATM input/output interface 235*c* is actually interfaced with the vocoder 220 through the E3/T3 link. The fourth input/output interface unit 235*d*, as a preparatory interface board, may be used when the capacity of the third input/output interface unit 235*a* is not sufficient to process the ATM data and typically it is a TP-25 interface.

On the other hand, the vocoder 220 in the base station controller 200 performs the voice data vocoding and includes eight high-speed transcoder and selectors HTSB1 to HTSB8. Since each of the high-speed transcoder and selectors HTSB1 to HTSB8 performs the same operation, only one of them will be described in detail.

The high-speed transcoder and selector HTSB has the same functions as the conventional transcoder and selector TSB, but has an additional function to select a high data channel and the entire channel capacity of the vocoders 220, which has 1920 channels, is the same as the conventional control system. The conventional control system (IS-95A/IS-95B) has 60 channels per clock but in the present invention the number of channels per block is extended up to 240. Also, the present invention uses the E3/T3 interface instead of the conventional HDLC (U-link) interface.

Furthermore, since the conventional TSB needs the channel capacity capable of processing only 60 channels of the voice vocoder of 9.6K/14.4 Kbps, the U-link is sufficient to process the voice data at a transmission rate of up to 10 Mbps. However, since the high-speed transcoder and selector HTSB of the present invention needs the higher capacity to process 20 voice channels and an additional high-speed data channel, the U-link is not sufficient capacity for the present invention.

The table 2 shows the capacity of the links with the comparison between the conventional link and the HTSB according to the present invention.

TABLE 2

Comparison of the capacity of links

| Capability/ kind of block | IS-95A/B (TBS) (60 ch) | IMT-2000 (HTSB) (240 ch) |
|---|---|---|
| Capability of link | 2.03M | 32.64M |

Figure 6:
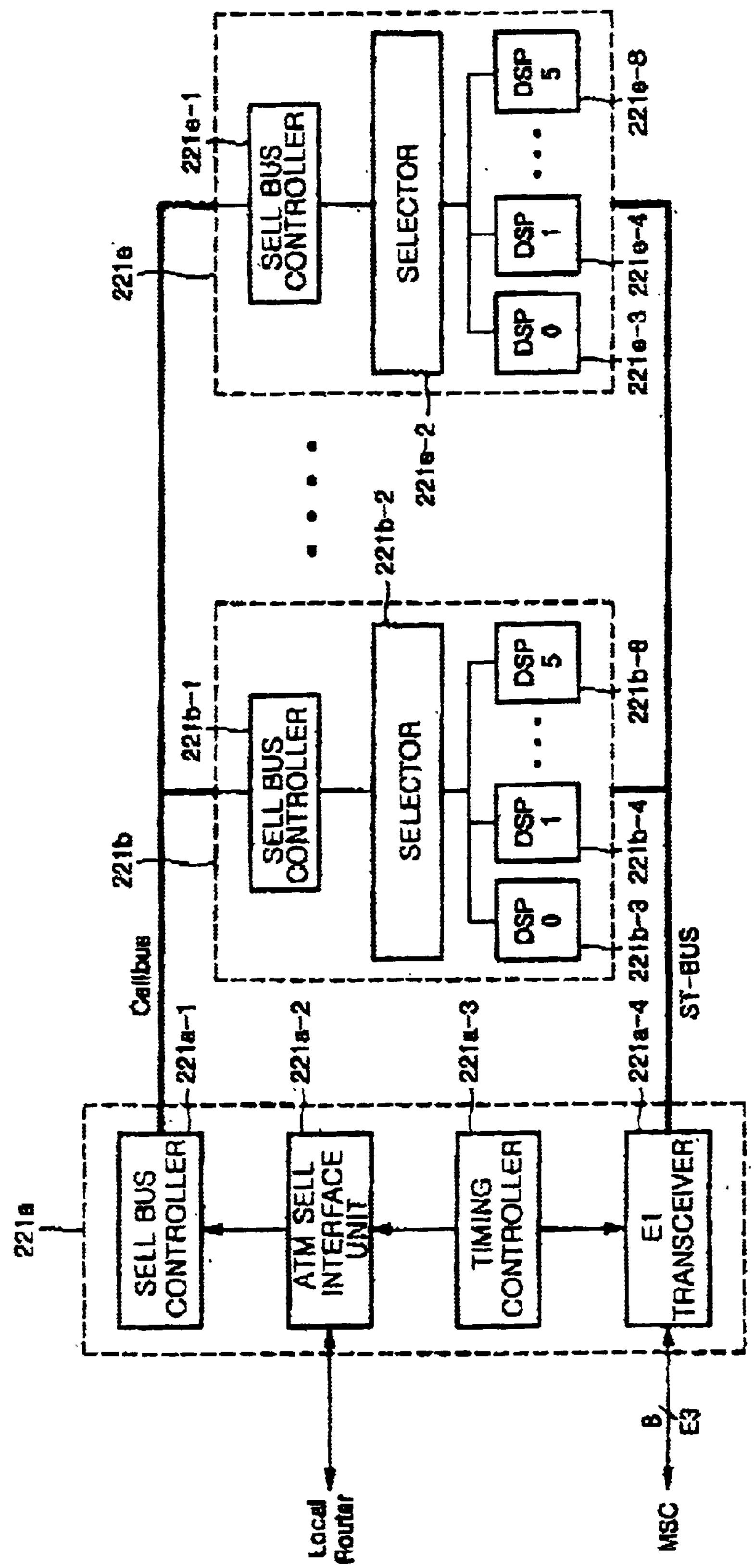
FIG. 6 is a block diagram illustrating the high-speed transcoder and selector HTSB according to the present invention.

FIG. 6 is a block diagram illustrating the high-speed transcoder and selector HTSB according to the present invention. As shown in FIG. 6, the high-speed transcoder and selector HTSB includes an enhanced vocoder interface assembly 221*a* and four enhanced vocoder operation assembly 221*b* to 221*e*.

An ATM cell interface 221*a*-2 in the enhanced vocoder interface assembly 221*a* is interfaced with the local router 210 through a T3 link and a cell bus controller 221*a*-1 controls procedure in order to load the ATM cells from the ATM cell interface 221*a*-2 on the a cell bus. A timing controller 221*a*-3 in the enhanced vocoder interface assembly 221*a* produces timing signals for interfaces of the ATM cells and E1 signals and an E1 transmitter/receiver 22*a*-4 appropriately transmits and receives the signals from the mobile switching center 300 and the E1 signals synchronized with E1 interface timing signals from the timing controller 221*a*-3.

Since each of the four enhanced vocoder operation assembly 221*b* to 221*e* has the same structure and performs the same operation, only one of them will be described in detail.

A cell bus controller 221*b*-1 in the enhanced vocoder operation assembly 221*b* receives the ATM cells transmitted through the cell bus and a selector 221*b*-2 selects a vocoder to process the received the ATM cell. According to the selection in the selector 221*b*-2, one of digital signal processors DSP0 to DSP5 is selected and the selected digital signal processor performs the vocoding operation. The vocoded data are transmitted to the E1 transmitter/receiver 221*a*-4 through a ST-BUS and the E1 transmitter/receiver 221*a*-4 transmits the received data to the mobile switching center (MSC) 300. Furthermore, the data from the mobile switching center (MSC) 300 are received by the E1 transmitter/receiver 221*a*-4 and the data from the E1 transmitter/receiver 221*a*-4 are processed by a selected one from the digital signal processors DSP0 to DSP5. The ATM cells passing through the digital signal processor DSP are transmitted to the cell bus controller 221*a*-1 in the enhanced vocoder interface assembly 221*a* and sequentially transmitted to the local router 210 through the ATM cell interface 221*a*-2. Also, the selector 221*b*-2 may function as a power or hand-off controller.

As stated above, since one digital signal processor can process 10 channels, total six digital signal processors may process 60 channels and since there are provided four vocoders in the present invention, 240 channels can be processed.

Figure 7:
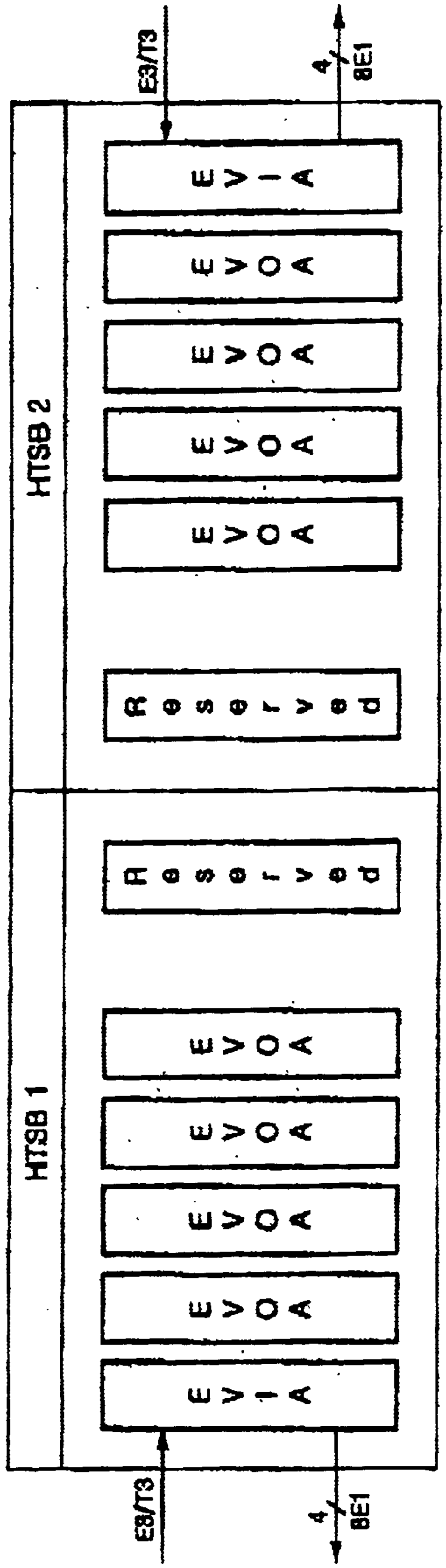
FIG. 7 is a block diagram illustrating a self-mount of the high-speed transcoder and selector according to the present invention.

FIG. 7 shows a self-mount of the high-speed transcoder and selector HTSB according to the present invention. Another characteristic of the high-speed transcoder and selector HTSB in the present invention is that the data transmission between boards is achieved by the cell bus method using a cubit device. The cell bus having a parallel bus structure of 37 lines (32 data lines and 5 control lines) performs a basic ATM switching transmission, such as a cell routing among cubit devices and a cell buffering, and supports unicast, multicast and broadcast functions.

Figure 8:
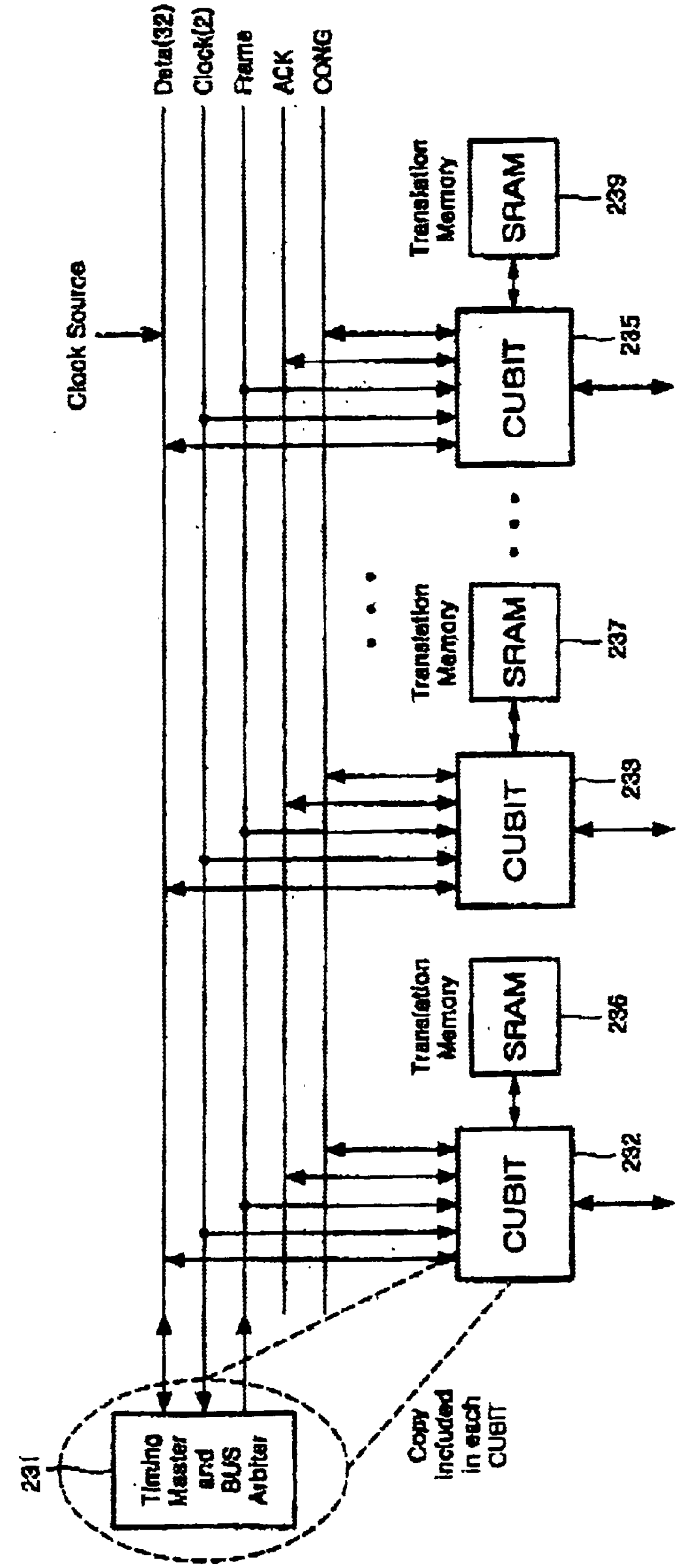
FIG. 8 is a block diagram illustrating the cell bus according to the present invention.

FIG. 8 is a block diagram illustrating the cell bus according to the present invention, there is provided a bus arbiter 231 in the front stage of the cell bus and the bus arbiter 231 controls 32 data lines, 2 clock lines, a frame line, an acknowledgement signal line and a control line. Each of cubit devices 232 to 235 is connected to the parallel bus including the 37 lines and then it provides an interface for the ATM cells or controls signals. Each fo SRAM devices 236 to 239 coupled to the cubit devices 232 to 235 temporarily stores the ATM cell data to be received or transmitted.

On the other hand, like the conventional global CDMA interconnection network (GCIN) of the IS-95A/B, the global router 700 performs the routing for the voice data soft hand-off and the high-speed data services between the base station controllers and performs a soft hand-off transmission for the high-speed data services. Also, the global router 700 performs is made by the high capacity ATM router of more than 5 Gbps and coupled to the packet data network (PSDN) 800 and the local router 600 through external interfaces. Furthermore, the global router 700 are coupled to the 12 local routers through the OC-3 ATM interfaces and is interfaced with the packet data network (PSDN) 800 through the IP tunneling method. The clock generator 400 and the base station management (BSM) 500 are interfaced with the global router 700 through E1 or E3 link.

Figure 9:
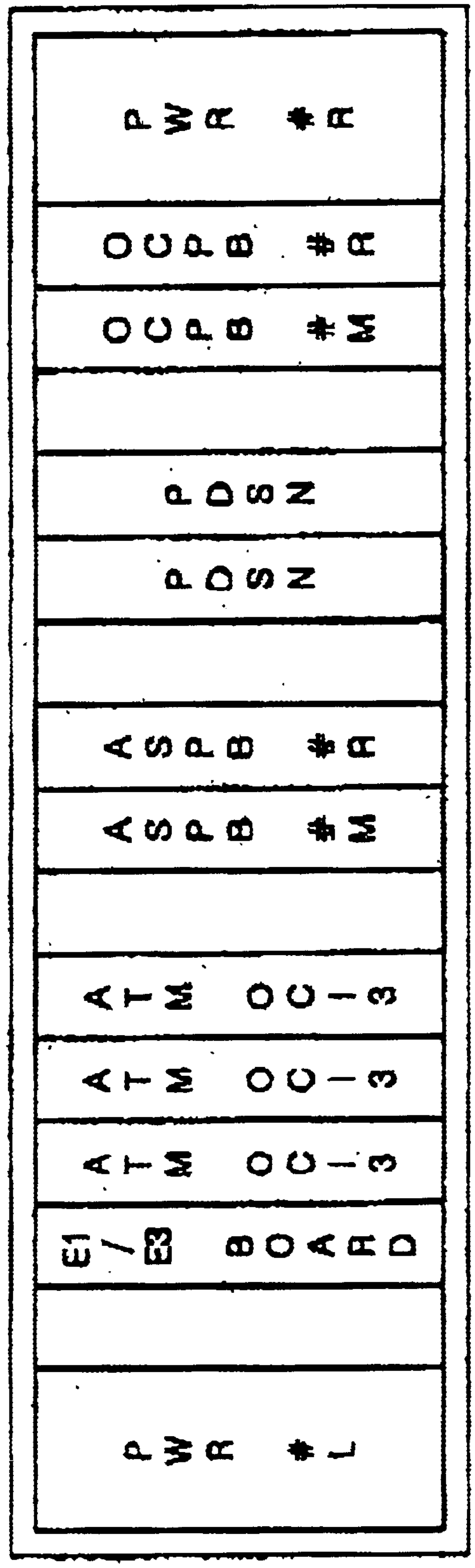
FIG. 9 is a block diagram illustrating a self-mount of the global router according to the present invention.

FIG. 9 shows a self-mount of the global router according to the present invention. As shown in FIG. 9, E1 or E3 board, 3 ATM OC-3 boards and 2 packet data networks are mounted on the global router. Also, OCPBA boards are doubly mounted on the global router, 16 E1/E3 ports are provided therein, and each of the ATM OC-3 board and the packet data network includes four OC-3 ports.

The clock generator 400, which serves as a subsystem thereof, provides standard time and reference signals required in IMT-2000 system. Only one clock generator per BSC (full name is required) is required in the conventional IS-95A/B, however, in the present invention, the clock signals which used in the system is provided by modifying the clock signal from the GPS. That is, only one clock generator is provided with respect to 12 BSCs and, after 2.048 MHz clock signal and TOD (Time Of Day) information are transmitted to the global router, the clock signal is transmitted from the global router to the ATM MUX/DEMUX unit 233 of the local router 210 and the BTS ATM interface assembly based on the master-slave concept.

As apparent from the above, the IMT-2000 system according to the present invention may satisfy the quality of services required in the multimedia services by implementing the network matching of the high capacity ATM switch and process high-speed data services of more than 384 Kbps. Also, the present invention may reduce the size of the base station controller by processing the calls and No. 7 signals in one board, thereby making it easy to design the base station controller.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a base transceiver station in an international mobile telecommunication system having a plurality of the base transceiver station (BTS), at least a base station controller (BSC), a base station management (BSM) and a mobile switching center (MSC), the apparatus composing:

a local routing means for interfacing the BTS with the MSC, for processing a call and a No. 7 signal for providing alarms occurred in the BSC to the BSM;

a vocoding means for vocoding voice data received through the local routing means;

a global routing means for interfacing among the local router, other local routers and the BSM; and a clock generating means for generating clocks necessary for controlling the BTS and the BSM, wherein the clocks are based on time and frequency clock signals received from a global positioning system (GPS), wherein the local routing means includes: (i) an OAM controlling means for generating a switching control signal, a multiplexing/demultiplexing control signal, an ATM (Asynchronous Transfer Mode) switch and protocol control signal and an ATM input/output control signal, thereby controlling a routing of ATM packet data, (ii) a switching means for interfacing the ATM packet data from the BTS in response to the ATM switching/protocol control signal, (iii) multiplexing/demultiplexing means for multiplexing ATM packet data received through the switching means based on the multiplexing/demultiplexing control signal, and for demultiplexing ATM packet data to be transmitted to the switching means, and (iv) an ATM input/output interface means for transmitting the alarm from the ATM switch and protocol controlling means to the BSC and transmitting the subscriber data to the vocoding means, in response to the ATM switch and protocol control signal.

2. The apparatus as recited in claim 1, wherein the multiplexing/demultiplexing means includes:

multiplexing/demultiplexing means for multiplexing the ATM packet data, thereby generating AAL2 signal, and for demultiplexing AAL signal;

signal converting means for converting the AAL2 signals to AAL2' signal; and an ATM signal adapter handling means for generating ATM cells based on AAL2' signals from the signal converting means.

3. The apparatus as recited in claim 2, further including a controlling means for controlling a signal conversion of the signal converting means and an ATM cell arrangement of the ATM signal adapter handling means.

4. The apparatus as recited in claim 2, wherein the multiplexing/demultiplexing means includes:

eight line interfaces each for multiplexing four channel signals received from the switching means, and for demultiplexing an input signal, thereby outputting four channel signals;

a first multiplexer/demultiplexer for multiplexing the signals from a first and second line interfaces and generating an AAL2 signal, and for demultiplexing the AAL2 signal, thereby generating two line signals;

a second multiplexer/demultiplexer for multiplexing the signals from a third and fourth line interfaces and generating AAL2 signal, and for demultiplexing the AAL2 signal, thereby generating two line signals;

a third multiplexer/demultiplexer for multiplexing the signals from a fifth and sixth line interfaces and generating AAL2 signal, and for demultiplexing the AAL2 signal, thereby generating two line signals; and a fourth multiplexer/demultiplexer for multiplexing the signals from a seventh and a eighth line interfaces and generating AAL2 signal, and for demultiplexing the AAL2 signal, thereby generating two line signals.

5. The apparatus as recited in claim 4, wherein the line interface is 4:1 multiplexer/demultiplexer.

6. The apparatus as recited in claim 4, wherein the multiplexer/demultiplexer is 4:1 multiplexer/demultiplexer.

7. The apparatus as recited in claim 1, wherein the ATM switch and protocol control means includes:

ATM subscriber access handler for transmitting AAL2' signals;

ATM switch for switching the subscriber data in response to the ATM switch and protocol control signal from the OAM control processor;

call processor for processing calls and No. 7 signals; and alarm control processor for collecting alarms occurred in the BSC and transmitting the alarms to the ATM switch.

8. The apparatus as recited in claim 1, wherein the ATM input/output interface means includes:

a first ATM interface for transmitting the alarm collected by OC-3 interface to the global router;

a second ATM interface, which is a reserved interface, for being used instead of the first ATM interface at a fail of the first ATM interface and for interfacing with another board and;

a third ATM interface for interfacing the data with the vocoding means; and a fourth ATM interface, which is a reserved interface, for being used instead of the third ATM interface when a capacity of the third ATM interface is insufficient.

9. An apparatus for controlling a base transceiver station in an international mobile telecommunication system having a plurality of the base transceiver station (BTS), at least a base station controller (BSC), a base station management (BSM), and a mobile switching center (MSC), the apparatus comprising:

a local routing means for interfacing the BTS with the MSC, for processing a call and a No. 7 signal for providing alarms occurred in the BSC to the BSM;

a vocoding means for vocoding voice data received through the local routing means, wherein the vocoding means includes: (i) an enhanced vocoder interface assembly connected to the local router and the MSC, for interfacing the ATM cells, and (ii) an enhanced vocoder operating assemblies connected to the enhanced vocoder interface assembly, for vocoding voice data and for performing a power control and a handoff;

a global routing means for interfacing among the local router, other local routers and the BSM; and a clock generating means for generating clocks necessary for controlling the BTS and the BSM, wherein the clocks are based on time and frequency clock signals received from a global positioning system (GPS).

10. The apparatus as recited in claim 9, wherein the enhanced vocoder interface assembly includes:

an ATM cell interface for interfacing the ATM cells through the local router and the T3 interface;

a cell bus controller for loading the ATM cell onto the cell bus;

a timing controller for generating a timing signal to be used for the ATM cell interface and E1 signal interface; an E1 transceiver for transmitting/receiving the E1 signal to/from the MSC based on the E1 signal interface timing signal.

11. The apparatus as recited in claim 10, wherein the cell bus controller includes:

a bus arbiter for performing a timing control and a bus arbitration; and a cubit device connected to the bus arbiter in parallel, for interfacing the ATM cells and exchanging the control signal.

12. The apparatus as recited in claim 9, wherein the enhanced vocoder operation assembly includes:

a cell bus controller for receiving the ATM cell transmitted through the cell bus and for transmitting the ATM cell through the cell bus;

a selector for selecting a vocoder to be used; and digital signal processor for vocoding the voice data.

13. The apparatus as recited in claim 12, wherein the digital signal processor processes ten (10) channel signals.

14. An apparatus for controlling a base transceiver station in an international mobile telecommunication system having a plurality of the base transceiver station (BTS), at least a base station controller (BSC), a base station management (BSM) and a mobile switching center (MSC), the apparatus comprising:

a local routing means for interfacing the BTS with the MSC, for processing a call and a No. 7 signal for providing alarms occurred in the BSC to the BSM;

a vocoding means for vocoding voice data received through the local routing means;

a global routine means for interfacing among the local router, other local routers and the BSM; and a clock generating means for generating clocks necessary for controlling the BTS and the BSM, wherein the clocks are based on time and frequency clock signals received from a global positioning system (GPS), wherein the global routing means performs an OC-3 interface with the local routing means, an OC-3 ATM interface with a local routing means in another base station controller, an E1 or E3 interface with a base station management (BSM), and the OC-3 ATM interface with a packet switched data network.

15. The apparatus as recited in claim 14, wherein the clock signals are provided by a clock generator that supports a plurality of BSC.

16. The apparatus as recited in claim 14, wherein the local routing means uses communication protocols based on an ATM packet-routing method.

17. The apparatus as recited in claim 14, wherein the vocoding means is communicatively coupled to the local routing means via E3/T3 links.

18. The apparatus as recited in claim 14, wherein the local routing means collects alarms generated in the BSC and transmits collected alarms to the global routing means, for transmission in turn to the BSM.

19. The apparatus as recited in claim 14, wherein the local routing means includes an operation and maintenance control processor that produces: (i) a switching control signal for ATM packet data, and (ii) a multiplexing/demultiplexing control signal for multiplexing and demultiplexing the ATM packet data.

20. The apparatus as recited in claim 14, wherein vocoding means comprises a plurality of high-speed transcoder/selectors that communicatively couple to a local router.

* * * * *